United States Patent [19]

Frasier

[11] Patent Number: 5,161,454
[45] Date of Patent: Nov. 10, 1992

[54] VALVE BODY GUARD

[75] Inventor: Scott T. Frasier, South Bend, Ind.

[73] Assignee: Allied-Signal Inc., Morristown, N.J.

[21] Appl. No.: 749,091

[22] Filed: Aug. 23, 1991

[51] Int. Cl.$^5$ .............................................. F15B 9/10
[52] U.S. Cl. .................................. 91/376 R; 92/168; 74/18.2; 277/212 FB
[58] Field of Search .............. 91/376 R, 369.1–369.4; 92/58.1, 78, 168 B; 74/18.2; 277/299, 212 FB

[56] References Cited

U.S. PATENT DOCUMENTS

| | | | |
|---|---|---|---|
| 3,908,704 | 9/1975 | Clement et al. | 277/212 FB |
| 3,995,502 | 12/1976 | Jones | 27/212 FB |
| 4,279,193 | 7/1981 | Satoh | 91/376 R |
| 4,327,925 | 5/1982 | Alexander et al. | 277/212 FB |
| 4,567,728 | 2/1986 | Ohmi et al. | 92/168 |
| 4,649,802 | 3/1987 | Myers | 91/376 R |

*Primary Examiner*—Thomas E. Denion
*Assistant Examiner*—F. Daniel Lopez
*Attorney, Agent, or Firm*—Leo H. McCormick, Jr.; Ken C. Decker

[57] ABSTRACT

A guard means for protecting a valve body extending from a hub of a servomotor. The valve body has a base with a plurality of openings therein through which mounting bolts attach the guard means to the housing of the servomotor, a bellows section having a first diameter extending from the base and connected to a second diameter by a taper, and an end member connected to the second diameter of the bellows section. The bellows section has a plurality of pleats, a portion of which are selectively locked in either a compressed position or an extended position to locate the end member adjacent the end of the valve body when the valve body is in its fully extended position. The pleats in the first diameter of the bellows section have a different closure force than the second diameter to selectively establish which of the first and second diameters of the bellows section that will initially move to locate said end section adjacent the end of the cylindrical member.

4 Claims, 2 Drawing Sheets

VALVE BODY GUARD

This invention relates to a valve body guard for protecting a cylindrical body which extends through the housing of a servomotor from damage caused by contamination.

Pneumatic servomotors are constructed in such a manner that air from the environment enters the rear chamber after passing through an axial passageway in a valve body which extends through an opening the housing of the servomotor. The valve body is protected from contamination which could affect the seal established between the surface of the valve body and a bearing surrounding the opening in the housing. U.S. Pat. Nos. 4,022,112 and 4,274,258 illustrate examples of boots that are attached to the rear housing of such servomotors to protect the valve body from contamination. These boots function in a satisfactory manner to protect the valve body, however, not all servomotors have the same stroke or length of valve body extending through the housing and as a result each different size servomotor needs to have an individual and specific boot.

I have devised a universal valve body guard which could be used with substantially most servomotors to protect the cylindrical body extending from a hub of a movable wall in a pneumatic servomotor from damage. The valve body guard has a base with a plurality of openings therein through which mounting bolts attach the guard to the housing of the servomotor, a bellows section having a first diameter extending from the base and connected to a second diameter by a taper, and an end member connected to the second diameter of the bellows section. The bellows section has a plurality of pleats, a portion of which are selectively locked in either a compressed position or an extended position to locate the end member adjacent the end of the valve body when the valve body is in its fully extended position. The pleats are connected by inner and outer hinges which have different angles formed between the side wall such that the first diameter of the bellows section has a different closure force than the second diameter to selectively establish which of the first and second diameters of the bellows section that will initially move to locate the end section adjacent the end of the cylindrical member and also so that the pleats will nestle into a compact closure position. The end member has a rib which aids in positioning a filter adjacent the cylindrical body to assure that only clean air is presented to the chamber during a brake application.

It is an object of this invention to provide a servomotor with a valve body guard which has an adjustable length to position a filter adjacent the end of a cylindrical projection extending through a bearing in an opening in the servomotor.

It is a further object to provide a servomotor with an adjustable valve body guard to accommodate for various stroke or valve body extensions that may be utilized with a particular housing of the servomotor.

It is a further object of this invention to provide a valve body guard for a servomotor having a bellows section with first and second diameter pleats connected to each other by a tapered section, the pleats being connected to each other by inner and outer hinges which have different expansion angles, said different angles allowing the pleats to be positioned in either a compressed or expanded by an external force, while in the compressed state, the pleats being nestled into a compact relationship.

These advantages and objects should be apparent from reading this specification while viewing the drawings wherein.

Figure 1:
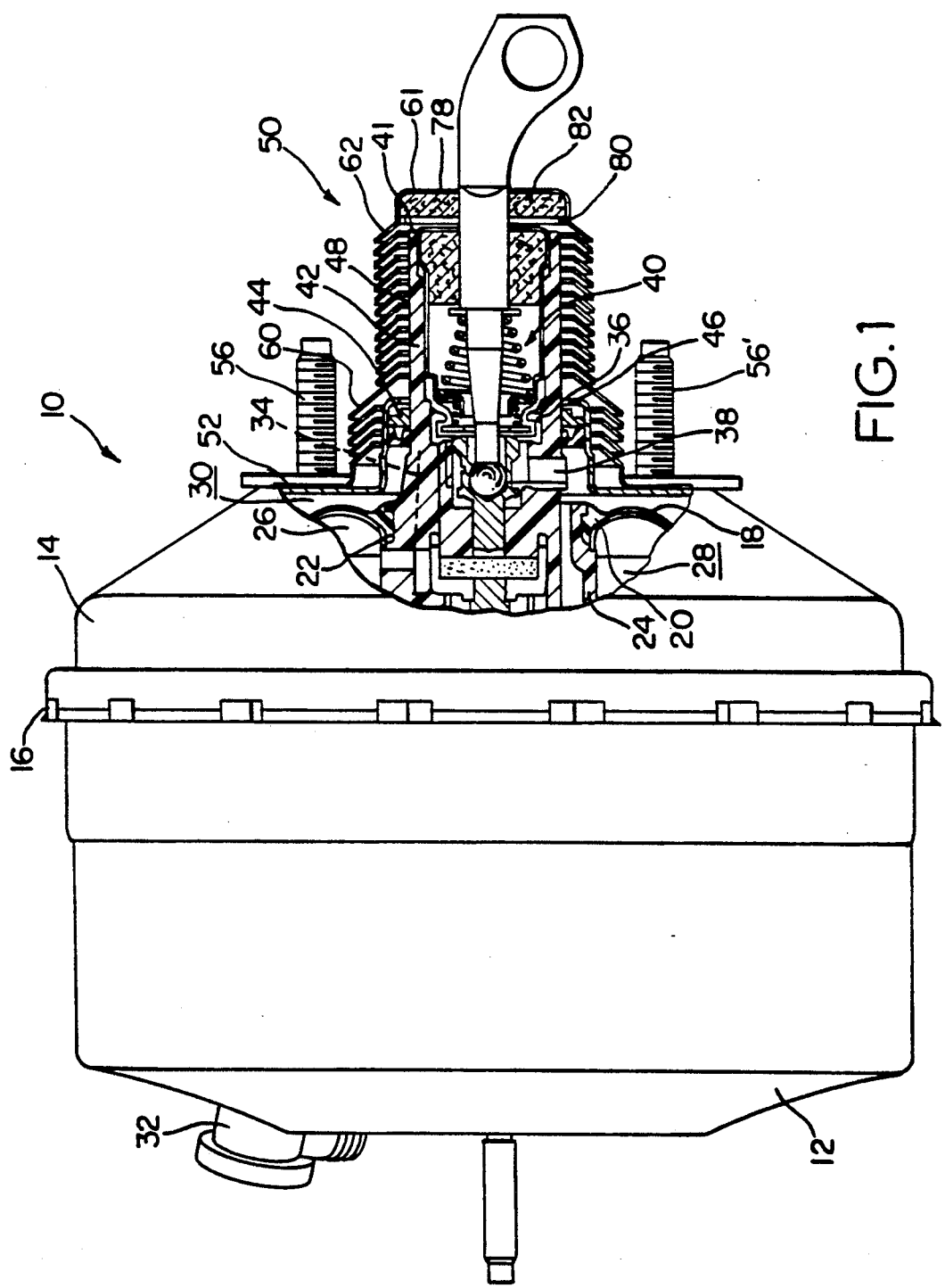
FIG. 1 is a schematic illustration of a brake booster showing a sectional view of the valve guard made according to the principles of this invention.

The servomotor 10 shown in FIG. 1 has a front shell 12 joined to a rear shell 14 by a lance joint 16. The lance joint 16 holds an external bead of a diaphragm 18 while an internal bead 20 is located in groove 22 on hub 24 adjacent wall 26. The wall 26 and diaphragm 18 separate the interior of the housing of servomotor into a front chamber 28 and a rear chamber 30. The front chamber 28 is connected to a source of vacuum, such as the intake manifold of an internal combustion engine, through a check valve 32. Chamber 28 is connected to chamber 30 through the interconnection of passage 34, bore 36 and slot 38 in cylindrical projection on valve body 42 extending from hub 24. A control valve 40 of the type disclosed in U.S. Pat. No. 4,953,446 is located in bore 36 to control the communication of air and vacuum between chambers 28 and 30. A bearing 44 which is located in opening 46 in shell 14 engages the peripheral surface 48 on valve body 42 to form a seal between chamber 28 and the surrounding environment.

Figure 3:
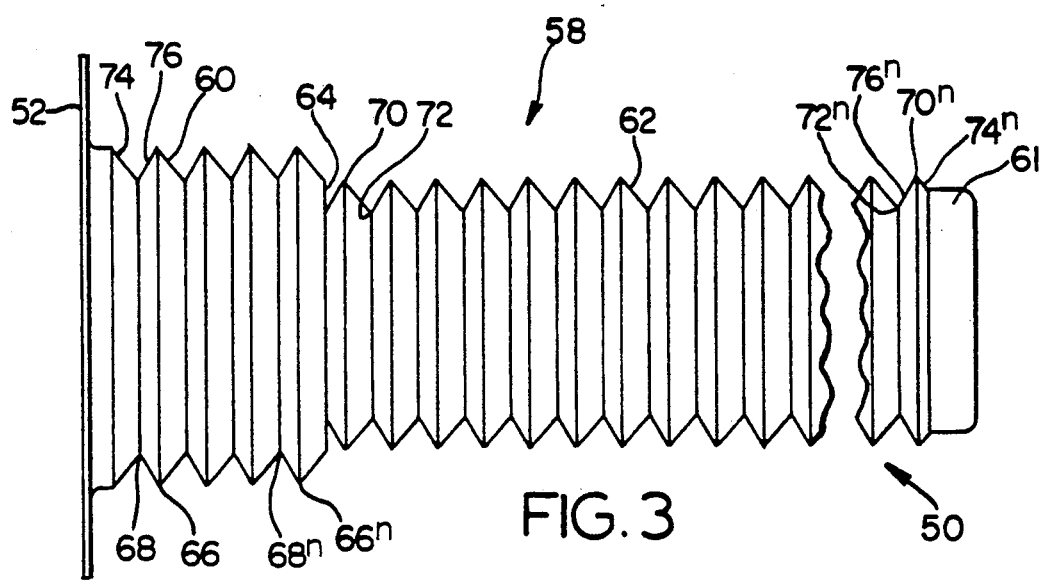
FIG. 3 is a view of the valve guard of FIG. 1 in a fully expanded condition.
Figure 2:
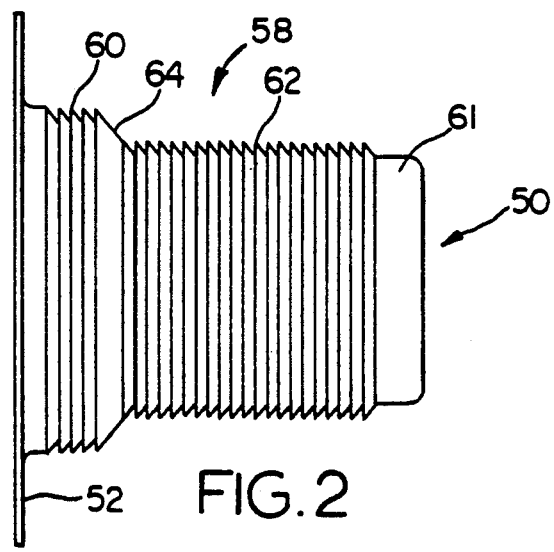
FIG. 2 is a view of the valve guard of FIG. 1 in a fully compressed condition.
Figure 4:
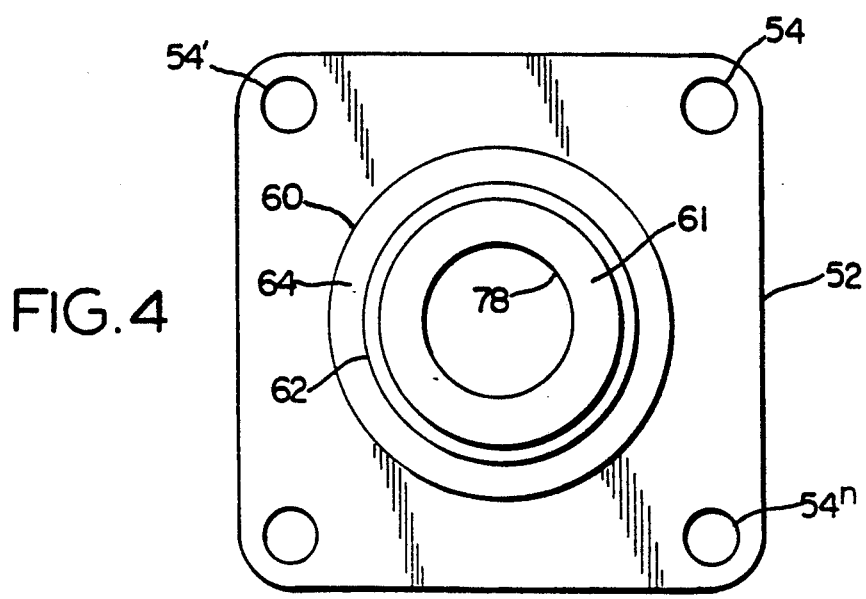
FIG. 4 is a end view of the valve guard of FIG. 2.

A valve guard 50, as best shown in FIGS. 2, 3 and 4, which is made of a plastic material has a base 52 with a plurality of openings 54, 54' ... $54^n$ corresponding to a mounting bolt pattern for the servomotor 10 of which bolts 56, 56', are shown in FIG. 1, a bellows section 58 and an end member 61. Base 52 is connected to shell 14 through mounting bolts 56, 56' that extend through openings 54, 54' ... $54^n$ prior to the mounting bolts 56, 56' being attached to the firewall of a vehicle.

The bellows section 58 which extends from base 52 has a first diameter 60 separated from a second diameter 62 by a taper 64. The first diameter 60 has a plurality of pleats with external hinges 66, 66' ... $66^n$ and internal hinges 68, 68' ... $68^n$ while the second diameter 62 has a plurality of external hinges 70, 70' ... $70^n$ and internal hinges 72, 72' ... $72^n$ which are joined by corresponding side walls 74, 74' ... $74^n$ and 76, 76' ... $76^n$. The angle formed between external hinges 66, 66' ... $66^n$ and 70, 70' ... $70^n$ and side walls 74, 74' ... $74^n$ and 76, 76' ... $76^n$ are shown in FIG. 3 in the fully expanded position are slightly less the angle formed between the internal hinges 68, 68' ... $68^n$ and 72, 72' ... $72^n$. This slight difference in angles, which is about 5 degrees, allows the internal hinges to pivot around the external hinges and nestle into a compact unit as shown in FIG. 2.

The end member 61 which is connected to the second diameter 62 of the bellows section 58 has an opening 78 therein through which air is presented to the cylindrical body 42. An internal rib 80 on the interior of end member 61, locates a filter 82 between said opening 78 and the end 41 of cylindrical body 42.

The filter 82 is placed in the valve guard 50 in the compressed condition as shown in FIG. 2 and the base 52 placed on mounting studs or bolts 56, 56'. A force is applied to base 52 causes a portion of the pleats of the bellow section to expand from the compressed position to locate end member 61 adjacent end 41 of the cylindrical body 42. The internal hinges 68, 68' ... 68$^n$ and 72, 72' ... 72$^n$ snap out of their nestled position and expand to the a position as shown in FIG. 3 to locate filter 82 adjacent end 41 when the wall 26 is in the rest position shown in FIG. 1. The stiffness of the plastic material of the valve guard 50 and the difference in angles between the internal and external hinges keep the valve guard 50 in the desired position once it is set.

Under some circumstances it may be desirable to have the first diameter 60 of the bellows section 58 move prior to the second diameter 62. If this is desired, the first diameter 60 would be constructed to have a different closure or spring force than the second diameter 62 to selectively establish which of the first and second diameters would initially move to locate end member 61 adjacent the end 41 of the cylindrical member 42.

In conclusion, the valve guard 50 is adjustable in length to allow for use on numerous boosters having control valve with valve bodies of different length. This ability to adjust the length of the valve guard 50, will allow for a cost savings since a single part can be used on various boosters.

I claim:

1. In a servomotor having a housing with an opening therein, a hub with a cylindrical body with an end that extends through said opening, valve body guard means attached to said housing to prevent contamination from affecting a sealing relationship between said opening and cylindrical body, a control valve located in the cylindrical body for communicating air to a chamber to create a pressure differential in the housing, said pressure differential moving said hub to develop a force which is transferred through said hub to supply an output member with an operational force in response to an input force applied to the control valve, said cylindrical body correspondingly moving with said hub in the opening from a fully extended position to an actuation position, the improvement in the valve body guard means comprising:

a base with a plurality of openings therein, said base being attached to said housing by mounting bolts that extend through said openings;

a bellows section extending from said base having a first diameter separated from a second diameter by a taper, said bellows section having a plurality of pleats a portion of which are selectively locked in either a compressed position or an extended position; and an end member connected to the second diameter of said bellows section, said end member having an opening therein through which air is presented to said cylindrical body, a portion of said pleats of said bellow means being expanded from the compressed position to locate said end member adjacent the cylindrical body, said base, bellows section and end member being made of a relatively rigid plastic material, one of said first and second diameters of said bellows section having a different closure force than the other to selectively allow said one to expand and contract prior to the other to maintain said end member adjacent said cylindrical body.

2. The valve body guard means as recited in claim 1 wherein said end member includes;

an internal rib that locates a filter between said opening in the end member and cylindrical body.

3. The valve body guard means as recited in claim 1 wherein said pleats of said bellows section have an inner and outer hinge which allows the connecting side walls to be nestled in the compressed position.

4. The valve body guard means as recited in claim 3 wherein said inner hinge has a different extension angle than said outer hinge to control the direction of nestling of the pleats of said bellows section.

* * * * *